(12) United States Patent
Quintero (10) Patent No.: US 10,973,290 B1
(45) Date of Patent: Apr. 13, 2021

(54) VIRTUALLY SEAMLESS AND SHAPE-RETAINING BAG WITH A FLEXIBLE AND SOFT MATERIAL EXTERIOR

(71) Applicant: Tronco LLC, Sunnyvale, CA (US)

(72) Inventor: Julio C. Quintero, Sunnyvale, CA (US)

(73) Assignee: Tronco LLC, Sunnyvale, CA (US)

( * ) Notice: Subject to any disclaimer, the term of this patent is extended or adjusted under 35 U.S.C. 154(b) by 121 days.

(21) Appl. No.: 15/956,929

(22) Filed: Apr. 19, 2018

(51) Int. Cl.
| A45C 3/00 | (2006.01) |
| A45C 13/10 | (2006.01) |
| A45C 3/06 | (2006.01) |
| B29D 22/00 | (2006.01) |
| A45F 3/04 | (2006.01) |
| B29K 75/00 | (2006.01) |
| B29K 105/04 | (2006.01) |

(52) U.S. Cl.
CPC ............... *A45C 3/001* (2013.01); *A45C 3/06* (2013.01); *A45C 13/103* (2013.01); *A45F 3/04* (2013.01); *B29D 22/003* (2013.01); *B29K 2075/00* (2013.01); *B29K 2105/04* (2013.01)

(58) Field of Classification Search
CPC ......... A45C 3/001; A45C 3/06; A45C 13/103; B29D 22/003; B29K 2075/00; B29K 2105/04
See application file for complete search history.

(56) References Cited

U.S. PATENT DOCUMENTS

| 2,464,350 | A | * | 3/1949 | Schmidt | A45C 1/024 150/117 |
| 3,622,056 | A | * | 11/1971 | Droeger | A45C 3/00 224/153 |
| 4,301,849 | A | * | 11/1981 | Litwack | A45C 3/06 150/103 |
| 4,703,519 | A | * | 10/1987 | Krenzel | A45C 3/02 112/475.08 |
| 5,004,091 | A | * | 4/1991 | Natho | A45C 5/02 150/129 |
| 5,284,542 | A | * | 2/1994 | Lee | A45C 5/02 156/242 |
| 5,544,792 | A | * | 8/1996 | Arnwine | A45C 7/0086 224/153 |
| 8,215,465 | B2 | * | 7/2012 | Iceberg | A45C 3/001 190/125 |
| 2010/0252154 | A1 | * | 10/2010 | Enders-Tretter | A45C 3/06 150/107 |

(Continued)

*Primary Examiner* — Tri M Mai
(74) *Attorney, Agent, or Firm* — Ansari Katiraei LLP; Arman Katiraei; Sadiq Ansari (57) ABSTRACT

A virtually seamless, flexible, and shape-retaining bag and a method of manufacturing such a bag is disclosed. The bag is formed from two complimentary three-dimensional custom shaped halves of molded flexible foam. A single and continuous piece of material, fabric, or textile is bonded or otherwise joined over the exterior of each half. The entire outer material covering each half is free of seams, stitching, or other joining of two separate pieces material. The complimentary and exposed edges of the two halves are joined about a hinge and fastener, whereby opening the fastener allows the two halves to separate about the hinge, and closing the fastener secures the first half to the complimentary second half of the bag.

12 Claims, 11 Drawing Sheets

(56) References Cited

U.S. PATENT DOCUMENTS

| | | | |
|---|---|---|---|
| 2013/0233660 A1* | 9/2013 | Bettua | A45C 5/14 190/9 |
| 2013/0309541 A1* | 11/2013 | Hsu | A45C 11/00 429/100 |
| 2014/0197000 A1* | 7/2014 | Harrison | A45C 13/02 190/103 |

* cited by examiner

VIRTUALLY SEAMLESS AND SHAPE-RETAINING BAG WITH A FLEXIBLE AND SOFT MATERIAL EXTERIOR

BACKGROUND ART

The manufacturing of purses, satchels, wallets, handbags, totes, backpacks, and other bags has remained mostly the same. The fabrics, patterns, and dimensions of a bag may change from year to year, but the manufacturing process does not.

Each bag may be made from multiple sections (e.g., six or more) of material that have different cuts, dimensions, and shapes. The sections of material are joined at multiple seams with stitching or glue to give the bag its shape and form. Soft materials, like leather, are used to give the bag a pliable shape and allow the bag to take or deviate from a default shape when filled with objects, and revert or take the default shape when empty.

Each seam on a bag, resulting from a stitch or glue point at which different sections of material are joined, represents a potential point of failure. Each seam disrupts the continuous shape of the bag, and may make the bag less aesthetically appealing. Each additional seam also adds to the cost of the bag by making the manufacturing of the bag more difficult and time consuming.

DETAILED DESCRIPTION

Disclosed is a virtually seamless, flexible, and shape-retaining bag. The bag is virtually seamless, flexible, and retains shape because it is formed from two complimentary three-dimensional custom shaped halves of molded flexible foam with the exterior of each half covered with a seamless and stitchless single piece of a particular material, and with the interior of each half similarly covered with a seamless and stitchless single piece of material. The particular material, covering the exterior of the bag, may be a natural material, such as leather, or a synthetic material, each of which provide the texture and feel of traditional bags. The complimentary and exposed edges of the two halves of the bag are joined about a hinge and fastener, whereby opening the fastener allows the two halves to separate about the hinge, and closing the fastener secures the first half to the complimentary second half of the bag. Straps, handles, pockets, and other ancillary structures can also be joined to the bag in a manner that does not involve segmenting the seamless and stitchless single piece of the particular material covering either half of the bag.

Figure 1:
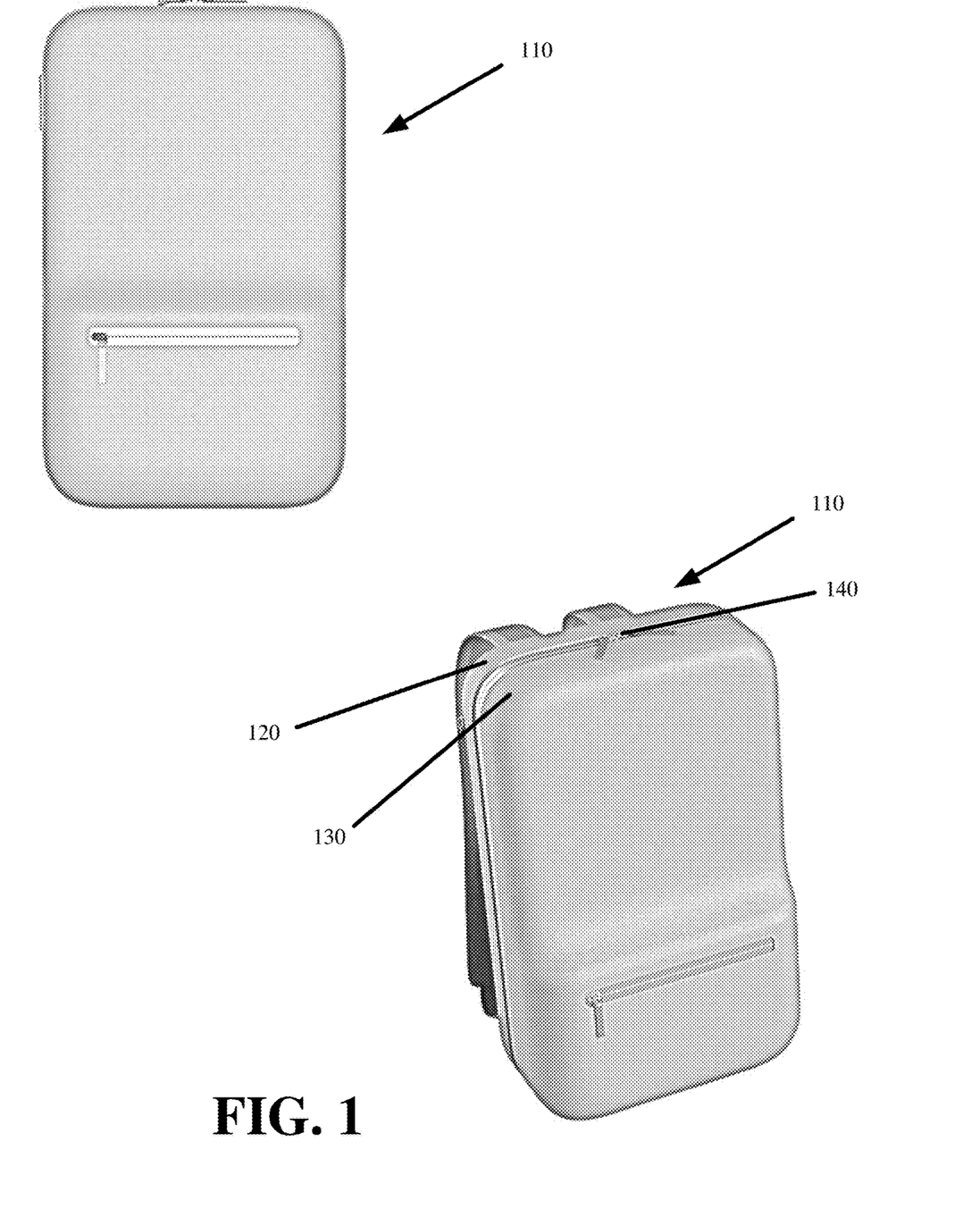
FIG. 1 provides front and side perspective views for a backpack embodiment of the virtually seamless, flexible, and shape-retaining bag.
Figure 2:
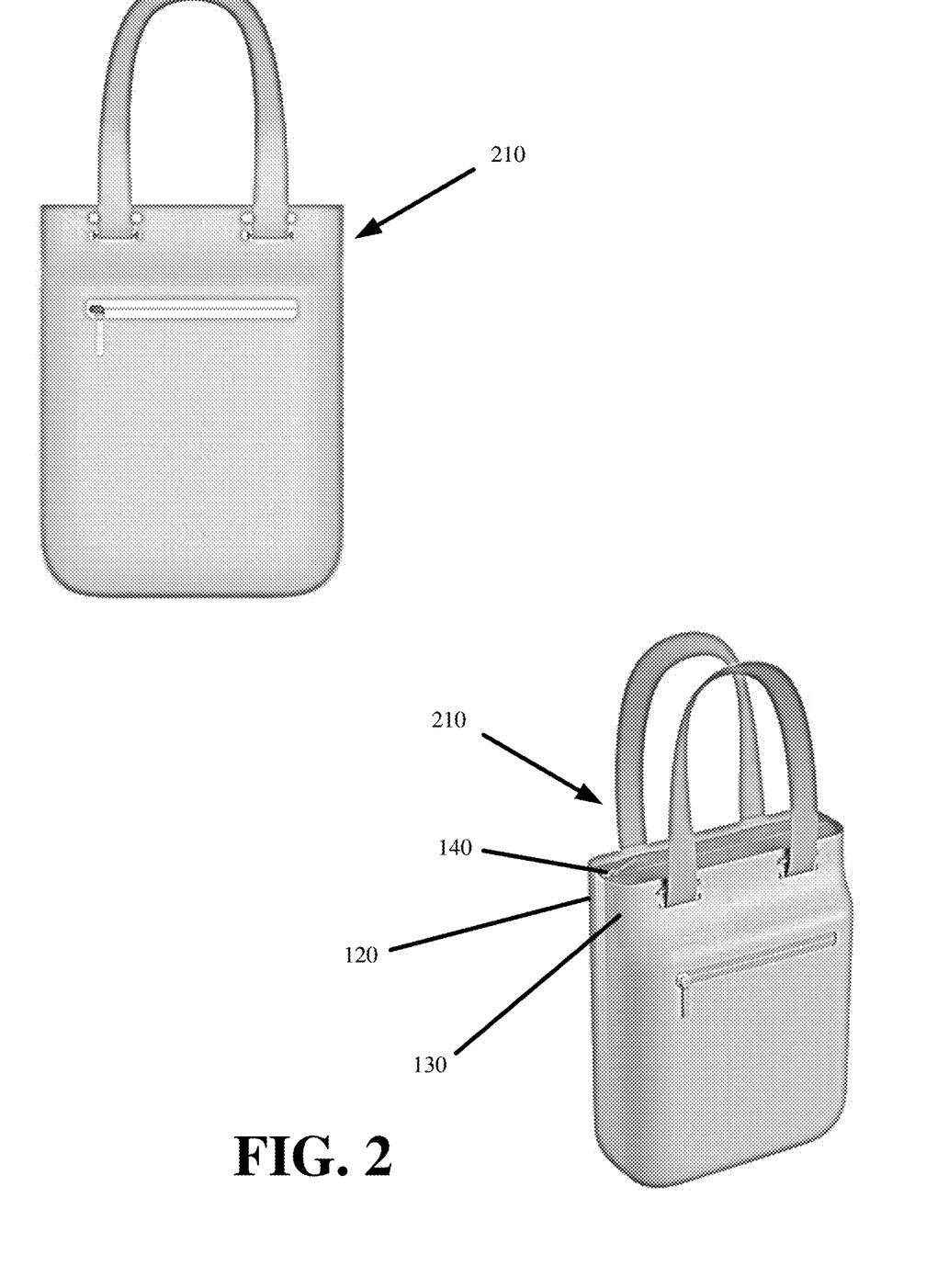
FIG. 2 provides front and side perspective views for a satchel embodiment of the virtually seamless, flexible, and shape-retaining bag.
Figure 3:
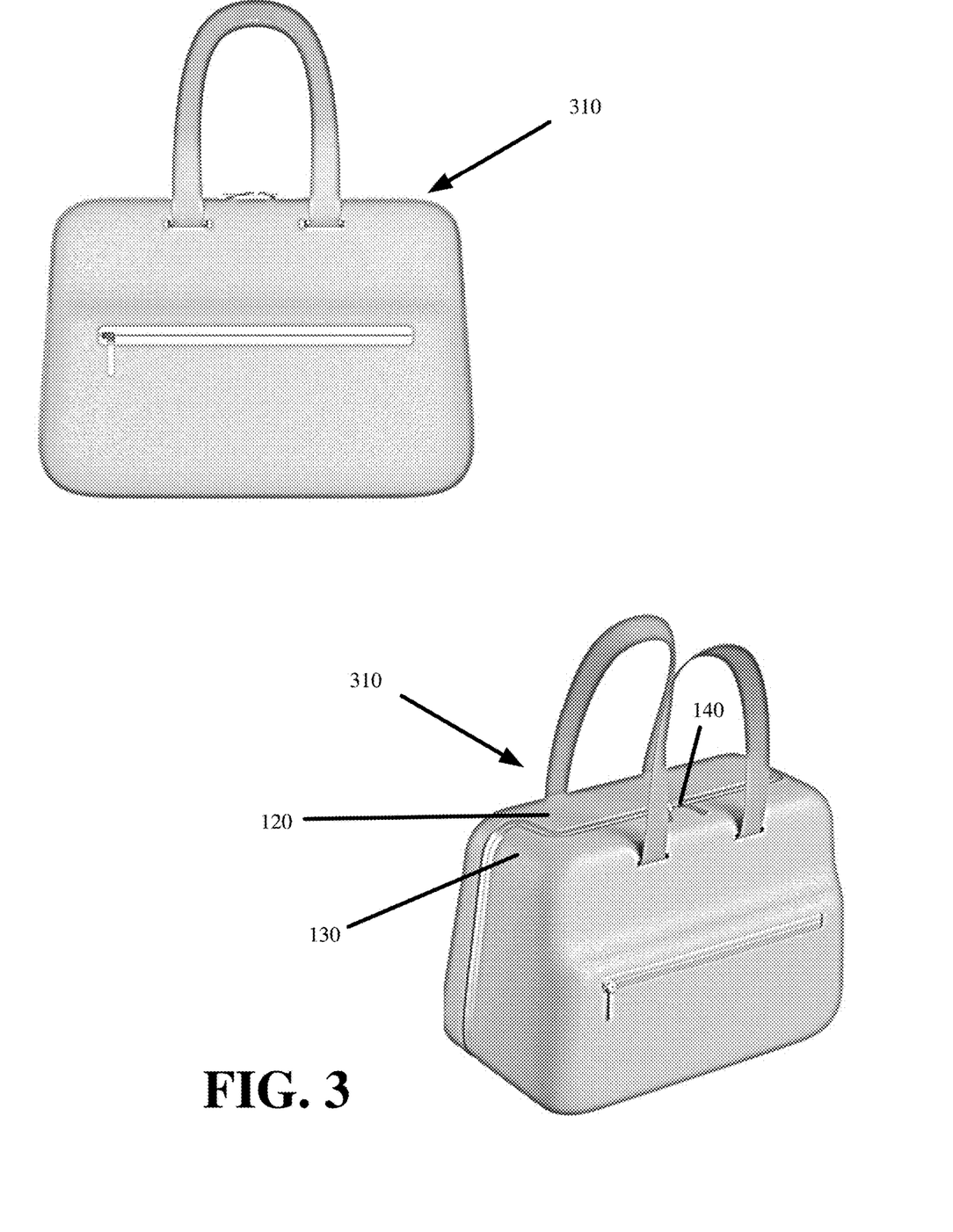
FIG. 3 provides front and side perspective views for a purse embodiment of the virtually seamless, flexible, and shape-retaining bag.

The virtually seamless, flexible, and shape-retaining bag can be manufactured as a purse, satchel, wallet, handbag, tote, backpack, or other flexible containing apparatus of different sizes and shapes without limitation. Further disclosed is a new manufacturing process for creating such a virtually seamless, flexible, and shape-retaining bag. FIG. 1 provides front and side perspective views for a backpack 110 embodiment of the virtually seamless, flexible, and shape-retaining bag. FIG. 2 provides front and side perspective views for a satchel 210 embodiment of the virtually seamless, flexible, and shape-retaining bag. FIG. 3 provides front and side perspective views for a purse 310 embodiment of the virtually seamless, flexible, and shape-retaining bag.

Each of the bags 110, 210, and 310 has two complimentary halves 120 and 130 or sides (e.g., front and back sides, left and right sides, top and bottom sides, etc.). The exterior of each half 120 and 130 is covered with a single piece of a particular material. The single piece of the particular material is continuous because it has no seams, no stitching, no glue points, and no other means of connecting two separate or cut pieces of the particular material about the exterior of one half of the bag.

The two halves 120 and 130 are joined by a fastener 140 and a hinge. In FIGS. 1-3, the fastener 140 is illustrated to be a zipper. Other fasteners, such as a clasp, Velcro, snaps, hooks and loops, ties, or magnets, may be used in place of the zipper to bring together and separate the two halves 120 and 130 of the bag. The fastener 140 may be disposed about a top of the bag, or span from a left side, across the top, to a right side of the bag. Other shapes, sizes, placement, and/or configurations for the fastener 140 are possible depending on the style or purpose of the bag.

Figure 4:
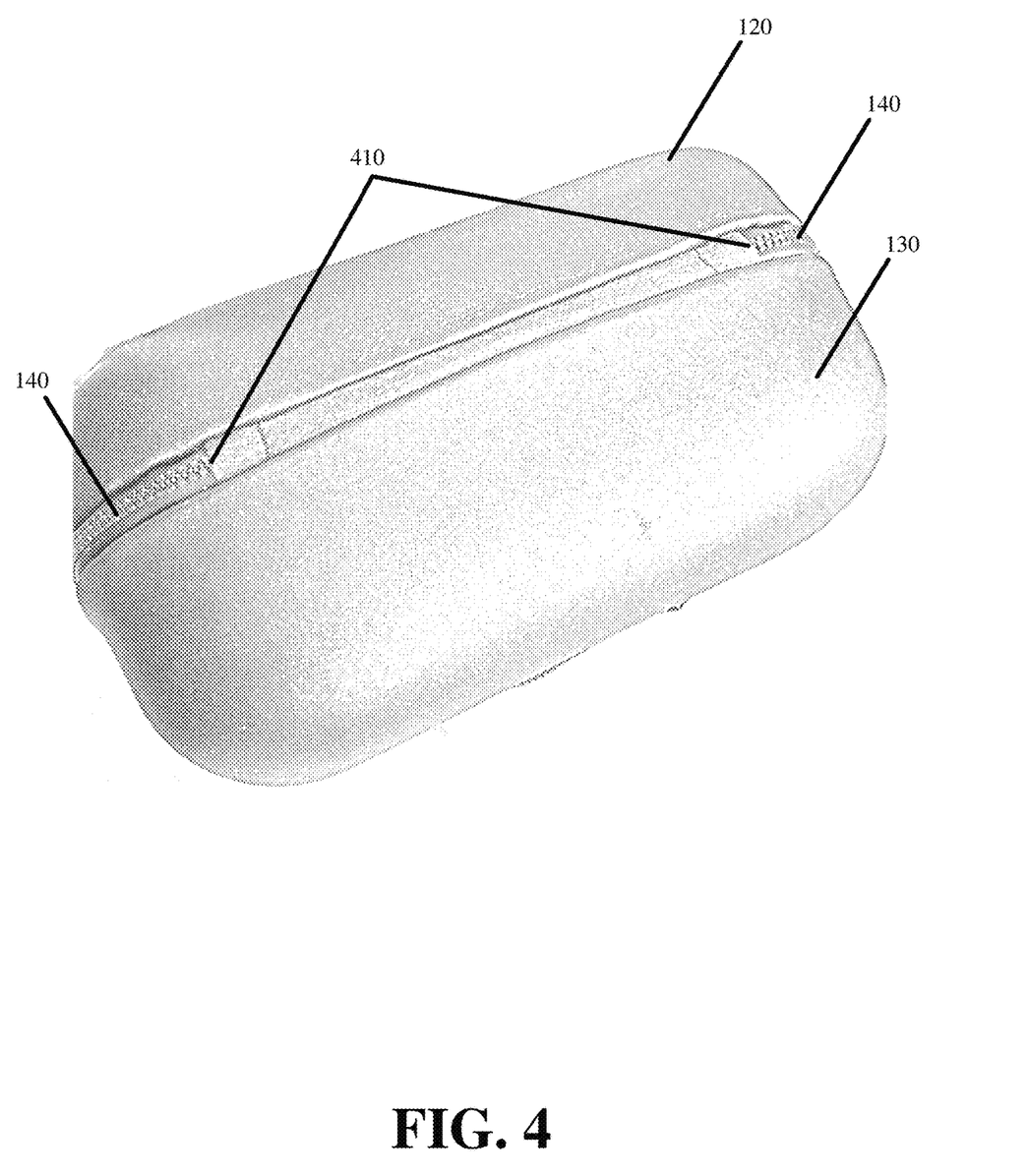
FIG. 4 illustrates an exemplary hinge of the virtually seamless, flexible, and shape-retaining bag in accordance with some embodiments.

FIG. 4 illustrates an exemplary hinge 410 of the virtually seamless, flexible, and shape-retaining bag in accordance with some embodiments. The hinge 410 may be disposed about a bottom of the bag. As further shown in FIG. 4, the hinge 410 may extend from one end of the fastener 140 to the other end of the fastener 140. The hinge 410 may be a bendable material with a length that is less than the full length at which the first and second halves 120 and 130 of the bag are joined. In some embodiments, the material for the hinge 410 may be elastic to allow the two halves 120 and 130 to separate from one another when the fastener 140 is opened and/or the two halves 120 and 130 are separated. The hinge 410 may also include interlocking elements that rotate about one another. In such cases, the hinge 410 may be made of metal or plastic.

Figure 5:
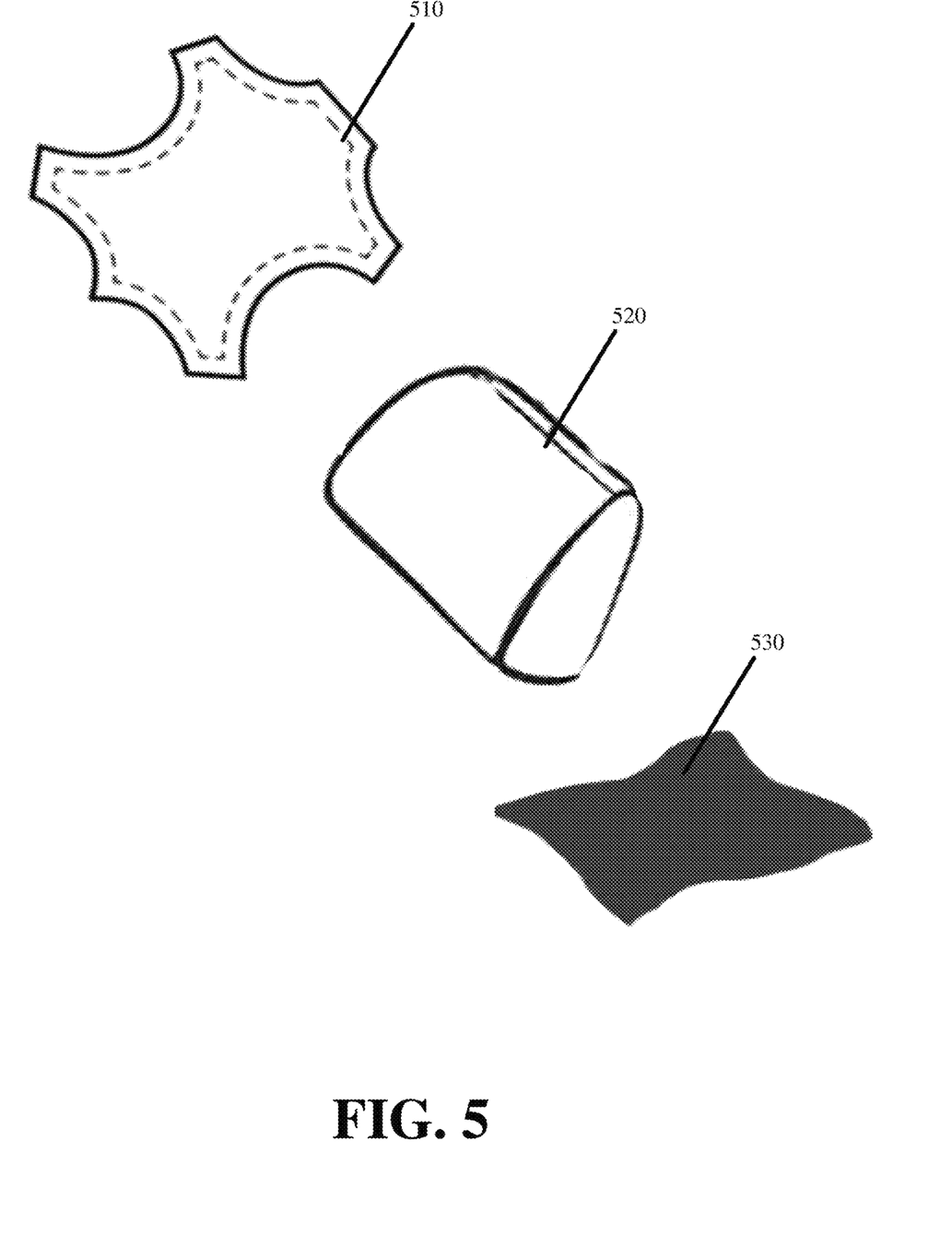
FIG. 5 conceptually illustrates the different layered composition for each half of the virtually seamless, flexible, and shape-retaining bag.

FIG. 5 conceptually illustrates the different layered composition for each half 120 and 130 of the virtually seamless, flexible, and shape-retaining bag. Each half 120 and 130 is comprised of at least three layers. A first or exterior layer may include a particular material 510. A second or middle layer may be a flexible, elastic, shape-retaining core 520. A third or inner layer may be a liner 530.

The particular material 510 for the exterior or outer layer may be a flexible natural or synthetic material with a thickness between 0.5 and 3 millimeters (mm). In particular, the exterior layer for each half 120 and 130 of a bag may be a seamless and stitchless single piece or section of the flexible natural or synthetic material. In other words, the particular material 510 for each half 120 and 130 of the bag does not does bear any seams, stitching, or joining of different section of material. Examples of flexible natural materials for the particular material 510 include leather, suede, or canvas. Examples of flexible synthetic materials for the particular material 510 of the exterior or outer layer include synthetic leather, microfiber, Alcantara®, or nylon as some examples. Accordingly, the particular material 510 can be any desired fabric or textile, including fabrics or textiles used in the manufacturing of traditional bags. The use of such fabrics or textiles provides the virtually seamless, flexible, and shape-retaining bag with a common texture and feel as those traditional bags, but without the seams and stitching that disrupt that texture and feel.

The flexible, elastic, and shape-retaining core 520 provides the custom three-dimensional form for each half 120 and 130 of the bag. The core 520 may be made of a heat-activated, moldable, flexible or open cell foam. For example, the core 520 can be an elastomeric polyurethane foam, flexible polyurethane foam, or thermo-moldable memory foam. These foams can be molded into any desired shape with application of heat and/or pressure. For example, each block of foam is molded to the form for one half of the bag, with the form including two or more different contours, levels, three-dimensional shapes, protrusions, or other structural variations. The foam will retain its molded shape while remaining soft and pliable based on elastic properties of the foam, even when bonded to the materials 510 and 530 for the outer and inner layers. Consequently, each core 520 can flex and bend in response to touch or other applied pressure and revert back to its molded custom three-dimensional form when the touch or pressure is removed based on the elastic properties of the foam. The amount of pressure or weight to bend or flex the foam depends on the density or thickness of the foam and the desired application of the core 520 (e.g., for a more flexible purse or more rigid backpack). To mimic the look, shape, and movement of a different traditional bags, the core 520 thickness can range between 1 and 9 mm.

To preserve the seamless and stitchless look of the bag exterior, each seamless and stitchless single piece of the particular material 510 for one half 120 or 130 of the bag is bonded to an exterior facing side of the core 520 that is molded with the custom three-dimensional form for that half 120 or 130 of the bag. As a result of the bonding, the seamless and stitchless single piece of the particular material 510 takes the form of the core 520, and more specifically, is reshaped to have the two or more different contours, levels, three-dimensional shapes, protrusions, or other structural variations of the foam forming the core 520. Bonding, as is described below, is a manufacturing technique in which one layer, such as the particular material 510, is directly adhered over the surface of another layer, such as the core 520, with an adhesive or other resin, and without any seams or stitching.

The liner 530 is used to cover the interior of the core 520 and line the inside of the bag. The liner 530 can be bonded to the interior of the core 520 in a similar manner as the particular material 510 is bonded to the exterior of the core 520. Consequently, the interior of the bag, like the exterior, can also be free of seams or stitching because of the bonding of the liner 530 to the core 520. Moreover, the liner 530 inherits the two or more different contours, levels, three-dimensional shapes, protrusions, or other structural variations of the foam forming the core 520. The liner 530 can be nylon, polyester, or other material found in the interior of traditional bags. The liner 530 may have a thickness between 0.3 and 2 mm.

When the three layers 510, 520, and 530 are bonded together to form one half 120 or 130 of the bag, that half 120 or 130 may have a thickness between 2 and 12 mm. The end result of joining two such halves 120 and 130 is a virtually seamless, flexible, and shape-retaining bag with the same or similar exterior and interior materials as traditional bags, and the same or similar shape, feel, texture, and movement as traditional bags, but without the numerous seams, stitch points, or glue points, and inner supporting elements (e.g., cardboard panels, plastic panels, felt, other thick fabrics, and/or other embedded frameworks or structural supports) that form and retain the shapes of those traditional bags. Stated differently, the single seamless and stitchless piece of material about the exterior (e.g., 510) and interior (e.g., 530) of each half 120 and 130 of the bag has multiple (e.g., two or more) contours, levels, three-dimensional shapes, protrusions, or other structural variations without any of the stitching or joining of different sections of material by which traditional bags take shape while remaining flexible and soft.

A new manufacturing process has been developed to produce the virtually seamless, flexible, and shape-retaining bags presented herein. In particular, a new manufacturing process has been developed to produce the flexible, elastic, and shape-retaining cores 520 that provide the custom three-dimensional forms for the different halves 120 and 130 of the bags, as well as, to bond the delicate natural and synthetic materials to the exterior and interior of the flexible, elastic, and shape-retaining cores 520 in a manner that eliminates seams without compromising the texture, feel, and movement of the materials and bags.

Figure 6:
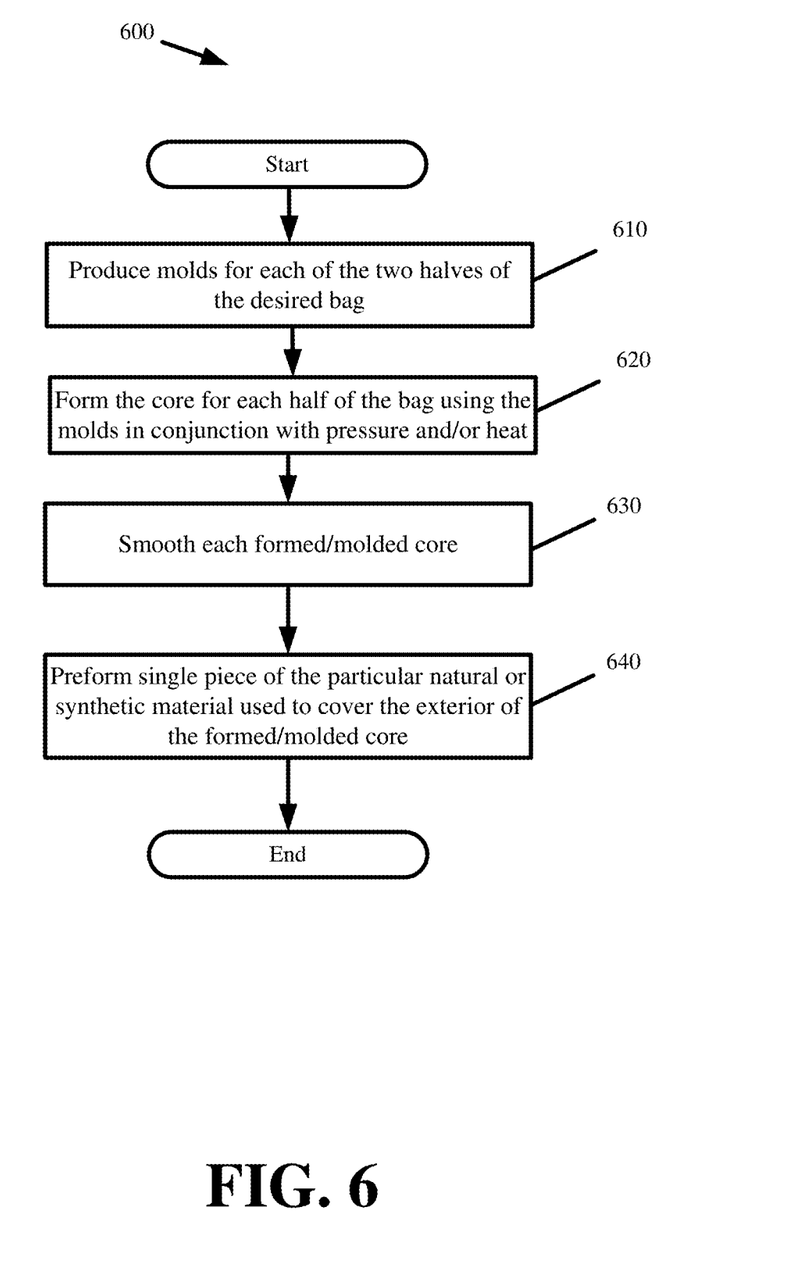
FIG. 6 presents a manufacturing process for molding the custom three-dimensional form of the virtually seamless, flexible, and shape-retaining bag.

FIG. 6 presents a manufacturing process 600 for molding the custom three-dimensional form of the virtually seamless, flexible, and shape-retaining bag. The manufacturing process 600 starts with producing (at 610) the molds for each of the two halves 120 and 130 of the desired bag. Each mold is made in the form of the desired resting shape for a complimentary half 120 or 130 of the bag. Each mold may have two or more contours, levels, three-dimensional shapes, protrusions, or other structural variations. Each mold may have a cavity and core. The cavity may be a concave plate with a custom three-dimensional shape in the form of one half 120 or 130 of the desired bag. The core may be a complimentary convex plate that may fit within the cavity.

The molds may attach to a molding machine (e.g., a stamp press machine and/or heat molding machine). The molding machine may be a machine that uses a pressurized cylinder or mechanized press to push the core into the cavity with a specifiable and high amount of force (e.g., several tones of force). The molding machine may also heat one or more of the cavity and core to specified temperatures prior to compressing a heat-activated or heat-molded matter, such as foam, with the heated cavity and/or core. In some embodiments, the molding machine has a sealed chamber that is heated in addition to or instead of heating the cavity and core.

The process may form (at 620) the flexible, elastic, and shape-retaining core 520 for each half 120 or 130 of the bag using the molds in conjunction with pressure and/or heat applied from the molding machine. Forming the flexible, elastic, and shape-retaining cores 520 may include inserting or injecting elastomeric polyurethane foam, flexible polyurethane foam, or thermo-moldable memory foam between the cavity and core of a particular mold, before compressing the foam in between the cavity and core with a controlled amount of pressure and/or heat from the molding machine. For instance, between 10 and 40 tons of pressure can be placed on the foam and the foam can be raised to a temperature between 150-250 degrees Fahrenheit for 1-5 minutes in order to obtain a custom three-dimensional molded form.

The amount of foam used to mold the cores 510 for each half 120 and 130 of a bag varies depending on the size, use, and desired flexibility of the bag. Less foam provides a thinner and more flexible bag, and more foam increases the rigidity of the core 520. A more flexible bag with less foam in the middle layer core may be desired when manufacturing a wallet or purse, whereas a less flexible bag with more foam in the middle layer core may be desired when manufacturing a backpack.

The process may smooth (at 630) each of the flexible, elastic, and shape-retaining cores 520 produced from the molding machine. Smoothing may include trimming excess foam off the cores 520. Smoothing may also include ensuring that the cores meet exact specifications (e.g., size, dimensions, etc.). Smoothing may be performed by hand or with precise etching or cutting machinery. Smoothing may involve running a blade across a surface of the core 520 with multiple passes, and with each pass removing a custom amount of foam from different areas of the core 520.

The process may then preform (at 640) the single seamless and stitchless single piece of the particular material 510 that will be used to cover the exterior of the molded core 520. Preforming may be optional depending on the material 510 that is used. For instance, leather may be preformed to allow it to better take the shape of the molded core 520 and to ensure that the material does not crack or tear when bonded. Preforming may include cutting a seamless and stitchless single piece of the particular material 510 about or greater than the dimensions of the molded core 520 onto which the material 510 is to be bonded. The single piece of cut leather can then be gradually stretched. The molding machine can also be used to stretch the material by exerting a gradually increasing pressure and/or heat on the material to preform the material in the desired shape, wherein the different amount of pressure and/or heat to apply varies depending on the properties of the outer material.

Figure 7:
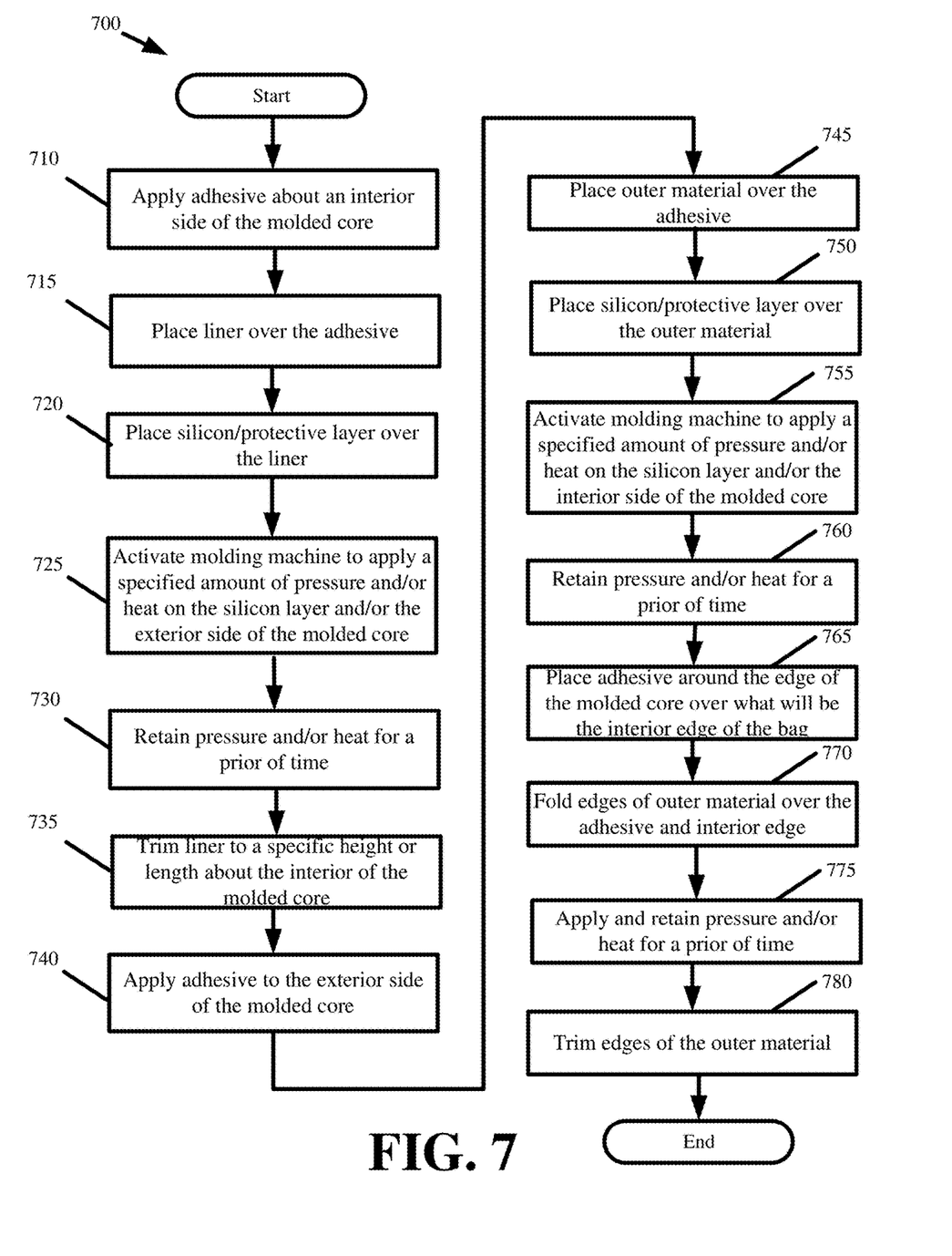
FIG. 7 presents a manufacturing process for bonding the layers of the virtually seamless, flexible, and shape-retaining bag.

FIG. 7 presents a manufacturing process 700 for bonding the layers of the virtually seamless, flexible, and shape-retaining bag. The bonding is performed for each half of a bag.

The process 700 includes applying (at 710) an adhesive about an interior side of the molded core 520 produced for a particular half 120 or 130 of the bag. A heat-activated adhesive may be used when applying heat during bonding. The liner 530 (e.g., nylon, polyester, or other material), for the inner layer of the bag, is placed (at 715) over the adhesive. A silicon layer or other protective layer may be placed (at 720) over the liner 530. The silicon layer may protect the liner 530 when heat is applied for the bonding process and may also protects the liner 530 from tearing or other disfiguration when pressure is applied on the liner 530. The process may then activate (at 725) the molding machine to apply a specified amount of pressure and/or heat on the silicon layer and/or the exterior side of the molded core 520 disposed within the mold cavity. The applied pressure smooths away any wrinkles when bonding the liner 530 to the molded core 520. The applied heat is set according to the thermal properties of the thermal-activated adhesive. The pressure and/or heat is retained (at 730) for a period of time (e.g., 2-5 minutes) to let the adhesive cure and seamlessly bond the liner 530 to the interior side of the molded core 520. The pressure and/or heat applied at 725 may be less than the pressure and/or heat applied to form the core 520 so as to not deform or reshape the core 520. Thereafter, the liner 530 may be trimmed (at 735) to a specific height or length about the interior of the molded core 520.

A second bonding is performed for the outer layer. Adhesive may be applied (at 740) to the exterior side of the molded core 530. Once again, a thermal-activated adhesive may be used when heat is applied during bonding. The outer material comprised of the seamless and stitchless single piece of the particular material 510, that may have been preformed, is placed (at 745) over the adhesive. The silicon layer may be placed (at 750) over the outer material 510 to protect the outer material 510 from heat, tearing, and/or taking the shape of the pressing cylinder of the molding machine. The process may then activate (at 755) the molding machine to apply a specified amount of pressure and/or heat on the silicon layer and/or the interior side of the molded core 520. The pressure and/or heat is retained (at 760) for a period of time (e.g., 2-5 minutes) to let the adhesive cure and seamlessly bond the outer material 530 to the molded core 520.

The edges or some length of the outer material 510 may extend over the molded core 520 so that the edges of the outer material 510 are not yet bonded and overlap with the liner 530 or the interior of the bag. Additional adhesive may be precisely placed (at 765) around the edge of the molded core 520 over what will be the interior edge of the bag. The edges of the outer material 510 may then be folded (at 770) over the adhesive and interior edge. Pressure and/or heat may be applied and retained (at 775) to overlay and bond the edges of the outer material 510 over the edges of the liner 530. The edges of the outer material 510 may then be precisely trimmed (at 780) to produce a clean and exact layering of the outer material 510 over the liner 530 so that no portion of the molded core 520 is exposed or visible.

In some embodiments, a waterproofing liquid or film may coat the particular material 510 of the outer layer. The coating may be applied to preserve or improve the longevity of the particular material 510 when exposed to outside elements.

As noted above, the bonding is repeated for each half 120 and 130 of the bag. Once the layers 510, 520, and 530 are bonded, the halves 120 and 130 are joined to create the bag. As noted with reference to FIG. 4, the halves 120 and 130 are joined about a fastener 140 and hinge 410.

Figure 8:
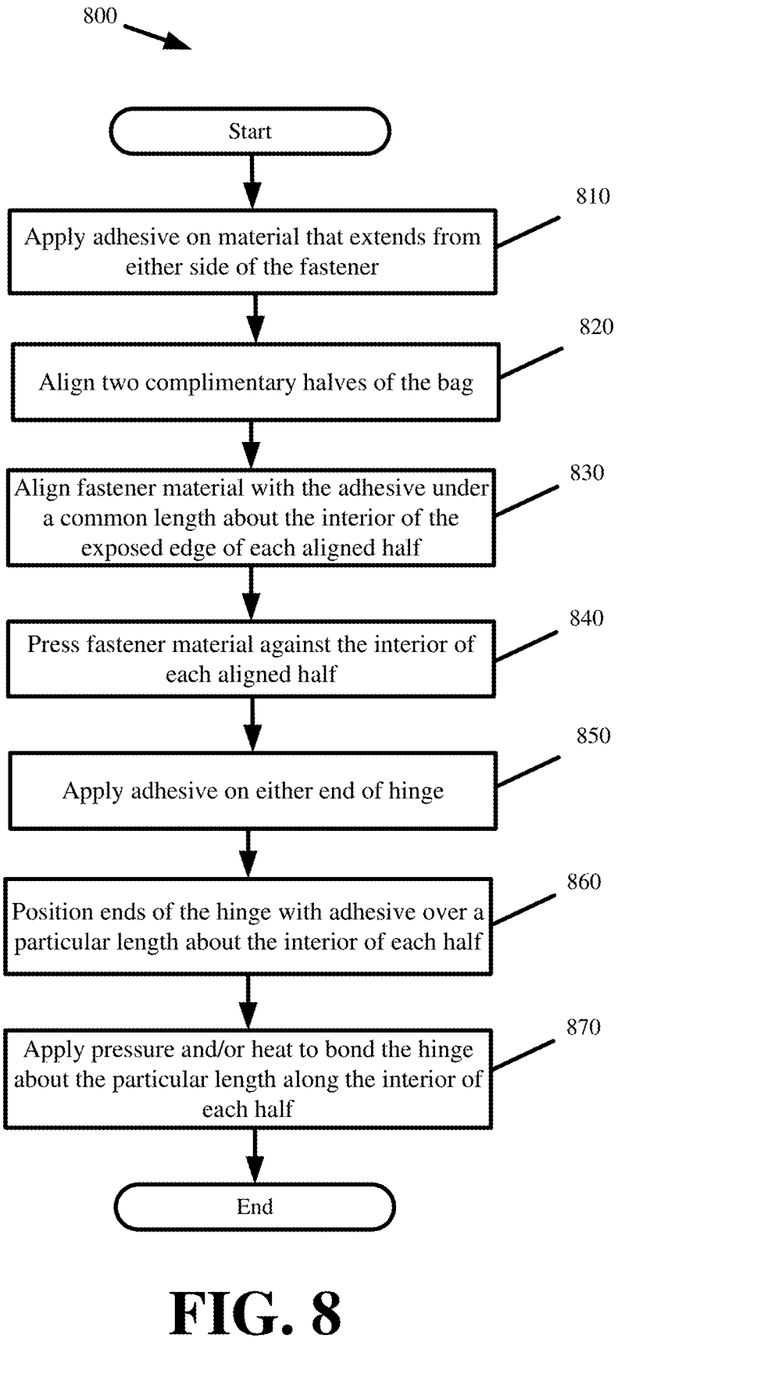
FIG. 8 presents a manufacturing process for joining the two halves of the virtually seamless, flexible, and shape-retaining bag.

FIG. 8 presents a manufacturing process 800 for joining the two halves 120 and 130 of the virtually seamless, flexible, and shape-retaining bag. The process 800 may include applying (at 810) adhesive on a material that extends from either side of the fastener 140. The two complimentary halves 120 and 130 of the bag are aligned (at 820) relative to one another. A mold or brace may be used to position and align the complimentary halves 120 and 130. The fastener 140 material with the adhesive may then be aligned (at 830) under a common length about the interior of the exposed edge of each half 120 and 130 of the bag. Once aligned properly, the fastener 140 may be pressed (at 840) upwards, with or without heat, so that the material with the adhesive about one side of the fastener 140 contacts and bonds with one half (e.g., 120) of the bag, and the material with adhesive about the other side of the fastener 140 contacts and bonds with the other half (e.g., 130) of the bag. A molding machine may be used to apply the pressure and/or heat for bonding the fastener 140 to either half 120 or 130 of the bag.

The fastener 140 closes and opens the bag. When the fastener 140 is closed (e.g., zipped), the two halves 120 and 130 are joined and cannot be separated. When the fastener is opened (e.g., unzipped), the two halves 120 and 130 of the bag can be separated from one another about the hinge 410.

The hinge 410 may be a length of flexible material that is similarly bonded to a different common length about the exposed edges of the two halves 120 and 130 of the bag. The hinge 410 permanently joins the two halves 120 and 130 of the bag about the common length spanned by the hinge 410.

With reference back to process 800, adhesive is placed (at 850) on different ends of the hinge 410. One end of the hinge 410 with the adhesive is positioned (at 860) over the interior of a first half (e.g., 120) of the bag about a particular length. The other end of the hinge 410 with the adhesive is positioned (at 860) over the interior of a second half (e.g., 130) of the bag about the same or complimentary particular length of the second half (e.g., 130). Pressure and/or heat may then be applied (at 870) to bond the hinge 410 about the particular length along the interior of both halves 120 and 130. The fastener 140 and/or hinge 410 can alternatively be stitched, sewn, or otherwise joined to the different halves of the bag without affecting the seamless appearance of the particular material or textile 510 bonded to the exterior of either half of the bag.

The hinge 410 can be the same material as used for the outer material 510. The hinge 410 can also be a different material with elasticity that allows the hinge 410 to stretch when the two halves 120 and 130 of the bag are separated. The hinge 410 can also be a set of metallic, plastic, or other interlocking elements that rotate about each other.

The fastener 140 and hinge 410 may span the full length (e.g., circumference) of the exposed edge of both halves 120 and 130 of the bag, thereby joining the full length of the exposed edge of both halves 120 and 130 when the fastener 140 is closed. FIG. 4 above illustrates an exemplary bag with a zipper (i.e., fastener 140) that attaches at a first end to a bottom left edge of a bag, extends over the left, top, and right edges or sides of the bag, and attaches at an opposite second end to a bottom right edge of the bag. The hinge 410 in FIG. 4 spans from the first end of the zipper 140 across the bottom of the bag to the second end of the zipper 140. Accordingly, when the zipper 140 is closed, the entire length of both halves 120 and 130 of the bag are joined. However, when the zipper 140 is opened, the left, right, and top sides of the bag separate from another and the two halves 120 and 130 separate about the bottom of the bag.

Figure 9:
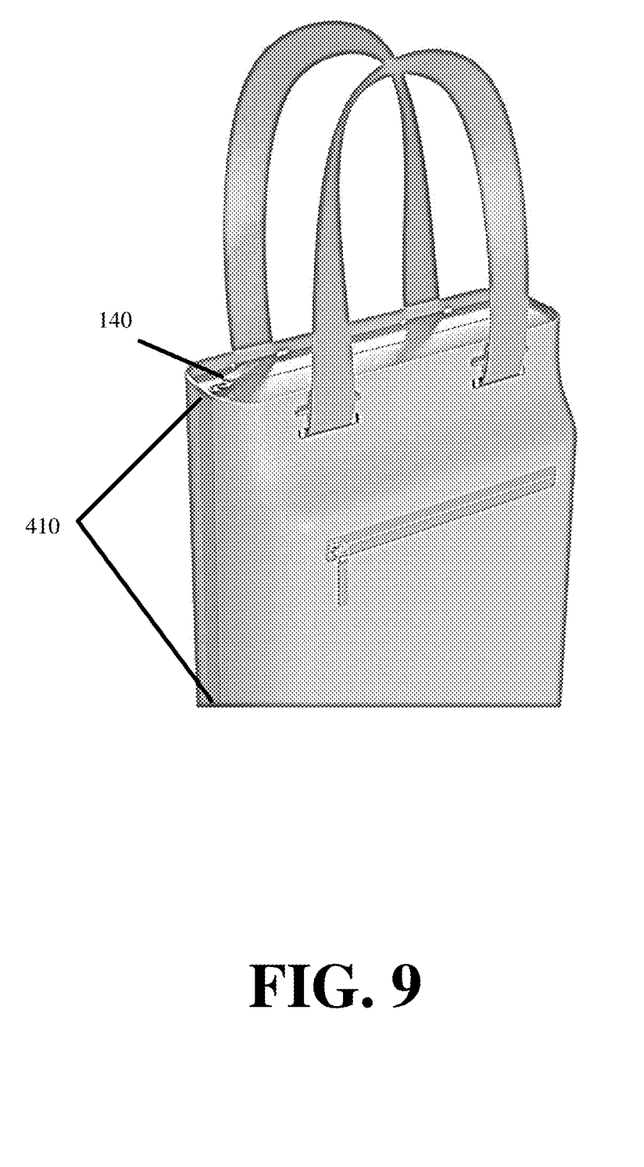
FIG. 9 illustrates an example fastener that may extend across the top of a purse and an example hinge that extends from the left, bottom, and right sides of the purse.

As another example illustrated in FIG. 9, the fastener 140 may extend across the top of a purse and the hinge 410 extends from the left, bottom, and right sides of the purse. The hinge 410 may be elastic so that when the fastener is opened, the different halves 120 and 130 of the purse bonded at the hinge 410 can be separated by some distance.

The fastener 140 and hinge 410 may also span different lengths that are less than the full length of the exposed edge of both halves 120 and 130 of the bag. For example, the fastener 140 may be a clasp located centrally about a top side of a bag. The hinge 410 may span the bottom of the bag and partially up the right and left sides of the bag such that the remaining lengths of the right and left sides of the bag and most of the top side are not joined.

The manufacturing process may be expanded to produce virtually seamless and stitchless straps, as well as, attach or otherwise add straps, pockets, and other accessories to the virtually seamless, flexible, and shape-retaining bag. For example, a strap may be formed by bonding two seamless and stitchless sections of material over a core that is molded in a desired shape of the strap using similar manufacturing processes as those described with reference to FIGS. 6 and 7. Similarly, a strap may be formed by wrapping a single seamless and stitchless section of material over a core and bonding the material to the core.

Figure 10:
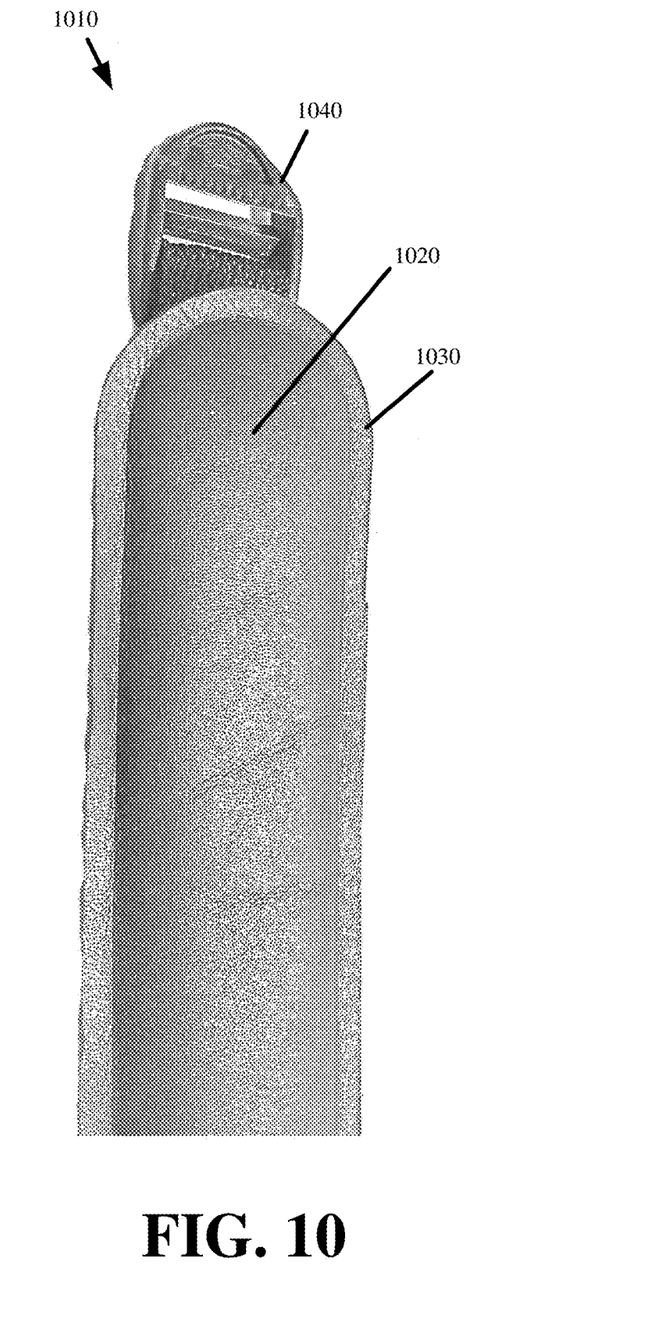
FIG. 10 illustrates an example of a virtually seamless and stitchless strap in accordance with some embodiments.

FIG. 10 illustrates an example of a virtually seamless and stitchless strap 1010 in accordance with some embodiments. In particular, FIG. 10 illustrates a first front half of the virtually seamless and stitchless strap 1010. The exterior of the first front half of the strap 1010 is covered by a single seamless and stitchless piece of a particular material (e.g., the same fabric or textile of the bag exterior). The particular material about the exterior of the strap 1010 does not have any seams or stitches, but has various contours, levels, three-dimensional shapes, protrusions, or other structural variations that result from bonding the fabric or material over a molded core. In particular, the particular material has an elevated center 1020 and flat surrounding edges 1030. The elevated center 1020 is due to an underlying piece of foam. A second back half of the single seamless and stitchless piece of the particular material (not shown) is bonded to the back half of the core with the flat edges of the second back half bonding directly to the flat edges 1030 of the first front half. An adjustable buckle 1040 may be bonded or other attached to the foam core and extend out from an opening cut along the second back half of the single seamless and stitchless piece of a particular material.

Straps can be bonded directly to the exterior of the bag. Alternatively, an incision may be made to create an opening from the outer layer to the inner layer of the bag. The incision cuts through a section of the outer material 510 and underlying section of the molded core 520 and liner 530. One end of the strap can be inserted through the openings. The strap end can then be joined against the interior of the bag via bonding, stitching, or other means of attachments. The opposite end of the strap can be joined in a similar manner to the same or opposite half 120 or 130 of the bag.

Figure 11:
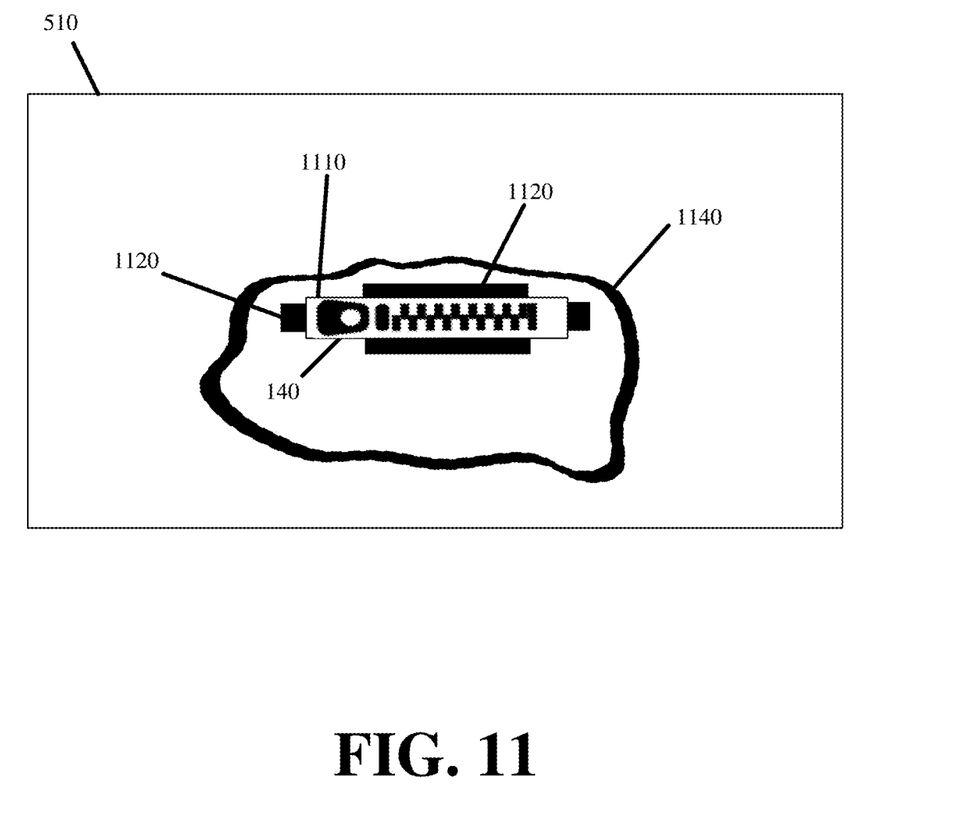
FIG. 11 conceptually illustrates joining a pocket to the virtually seamless, flexible, and shape-retaining bag of some embodiments.

Pockets may be joined using similar manufacturing techniques as joining the straps. FIG. 11 conceptually illustrates joining a pocket to the virtually seamless, flexible, and shape-retaining bag of some embodiments. An opening 1110 is made for the pocket about the outer material 510 and underlying sections of the molded core 520 and liner 530. The opening 1110 provides a point of access to the pocket. A fastener 140 may be joined to the interior of the bag where the opening 1110 is made by bonding or joining ends 1120 of the fastener 140 to the interior of the bag. The fastener 140 opens and closes access to the pocket opening. The pocket pouch 1140 may then be joined about the interior of bag over and around where the opening 1110 is located. For instance, the pocket pouch 1140 is bonded, stitched, or otherwise attached to the interior of the bag with the pocket pouch covering the pocket opening 1110 from inside the bag. When the fastener 140 is opened, the user can reach from the exterior of the bag, through the opening, into the pocket pouch 1140.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

I claim:

1. A seamless and stitchless bag comprising:
   a first molded core of flexible foam comprising an exterior with a three-dimensional shape that protrudes outwards with a plurality of contours from a first edge;
   a first preformed continuous section of material preformed in the three-dimensional shape of the first molded core via a gradual stretching of the first preformed continuous section of the material prior to bonding the first preformed continuous section of the material to the first molded core;
   an adhesive directly bonding the first preformed continuous section of the material to the exterior of the first molded core of flexible foam with edges of the first preformed continuous section of the material extending over and around the first edge to an interior of the first molded core to provide an entirely seamless and stitchless joining of the first preformed continuous section of the material to the first molded core;
   a second molded core of flexible foam comprising an exterior with a three-dimensional shape that protrudes outwards with a plurality of contours from a second edge that matches a shape of the first edge of the first molded core;
   a second preformed continuous section of the material preformed in the three-dimensional shape of the second molded core via a gradual stretching of the second preformed continuous section of the material prior to bonding the second preformed continuous section of the material to the second molded core;
   an adhesive directly bonding the second preformed continuous section of the material to the exterior of the second molded core of flexible foam with edges of the second preformed continuous section of the material extending over and around the second edge to an interior of the second molded core to provide an entirely seamless and stitchless joining of the second preformed continuous section of the material to the second molded core; and
   a fastener comprising a first side that is bonded to the interior of the first molded core along a length of the first edge, and a second side that is bonded to the interior of the second molded core along a complimentary length of the second edge, wherein the fastener is free of stitching.

2. The seamless and stitchless bag of claim 1, wherein the fastener secures the length of the first edge to the complimentary length of the second edge when fastened, and releases the length of the first edge from the complimentary length of the second edge when unfastened, and wherein the length is less than a full length of either the first edge or the second edge.

3. The seamless and stitchless bag of claim 2, wherein the fastener is a zipper with material about either side of the zipper, wherein the material about a left side of the zipper is joined about the length of the first edge, and the material about a right side of the zipper is joined about the complementary length of the second edge.

4. The seamless and stitchless bag of claim 1 further comprising a hinge bonded to the interior of the first molded core and the second molded core, and wherein the hinge is free of stitching.

5. The seamless and stitchless bag of claim 4 further comprising an adhesive bonding the fastener and the hinge to the interior of the first molded core and the second molded core.

6. The seamless and stitchless bag of claim 1 further comprising:
   a first liner bonded to the interior of the first molded core of flexible foam; and
   a second liner bonded to the interior of the second molded core of flexible foam, and wherein the first liner and the second liner are different fabrics or textiles than either the first preformed continuous section of the material or the second preformed continuous section of the material.

7. The seamless and stitchless bag of claim 6, wherein the first preformed continuous section of material is a single seamless and stitchless piece of leather, wherein the liner is at least one of nylon or polyester, and wherein the first preformed continuous section of the material and the liner are free of seams and stitching when bonded to the first molded core.

8. The seamless and stitchless bag of claim 7, wherein the first molded core of flexible foam is one of elastomeric polyurethane foam, flexible polyurethane foam, or thermomoldable memory foam.

9. The seamless and stitchless bag of claim 1, wherein thickness of the first molded core of flexible foam and the first preformed continuous section of the material is less than 6 millimeters.

10. A seamless and stitchless bag comprising:
    a first length of flexible foam molded in a first three-dimensional form with an exterior that protrudes outwards with a plurality of contours from a first edge to form a first half of the bag;
    a second length of flexible foam molded in a second three-dimensional form with an exterior that protrudes outwards with a plurality of contours from a second edge to form a second half of the bag;
    a fastener for opening and closing the two halves of the bag, wherein the fastener comprises a first side bonded to an interior of the first half along a length of the first edge that is entirely free of stitching, and a second side bonded to an interior of the second half along a length of the second edge that is entirely free of stitching;
    a first seamless and stitchless single piece of a particular fabric or textile that is preformed in the first three-dimensional form, via stretching of the first seamless and stitchless single piece of the particular fabric or textile, prior to bonding to the first length of flexible foam, with dimensions extending over the first length of flexible foam and past the first edge, wherein the first seamless and stitchless single piece of the particular fabric or textile is free of seams or stitching;
    a second seamless and stitchless single piece of the particular fabric or textile that is preformed in the second three-dimensional form, via stretching of the second seamless and stitchless single piece of the particular fabric or textile, prior to bonding to the first length of flexible foam, with dimensions extending over the second length of flexible foam and past the second edge, wherein the second seamless and stitchless single piece of the particular fabric or textile is free of seams or stitching; and an adhesive directly bonding (i) the first seamless and stitchless single piece of the particular fabric or textile to the exterior of the first length of flexible foam with the first seamless and stitchless single piece of the particular fabric or textile extending over and around the first edge to the interior of the first half to provide an entirely seamless and stitchless joining of the first seamless and stitchless single piece of the particular fabric or textile to the first length of flexible foam, and (ii) the second seamless and stitchless single piece of the particular fabric or textile to the exterior of the second length of flexible foam with the second seamless and stitchless single piece of the particular fabric or textile extending over and around the second edge to the interior of the second half to provide an entirely seamless and stitchless joining of the second seamless and stitchless single piece of the particular fabric or textile to the second length of flexible foam.

11. The seamless and stitchless bag of claim 10 further comprising an opening about a section of the first seamless and stitchless single piece of a particular fabric or textile and underlying section of the first length of flexible foam, and at least one strap extending through the opening.

12. The seamless and stitchless bag of claim 10 further comprising an opening about aligned sections of the second seamless and stitchless single piece of the particular fabric or textile and the second length of flexible foam, and a pocket bonded against an interior side of the second length of flexible foam about said opening.

* * * * *